US011174413B2

(12) United States Patent
 Matthews

(10) Patent No.: US 11,174,413 B2
(45) Date of Patent: Nov. 16, 2021

(54) OPTICAL FIBER COATING COMPOSITIONS WITH HYDROGEN BONDING, NON-COVALENT BONDING, CROSS-LINKERS

(71) Applicant: CORNING INCORPORATED, Corning, NY (US)

(72) Inventor: James Robert Matthews, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 16/437,469

(22) Filed: Jun. 11, 2019

(65) Prior Publication Data

US 2020/0017706 A1  Jan. 16, 2020

Related U.S. Application Data

(60) Provisional application No. 62/697,507, filed on Jul. 13, 2018.

(51) Int. Cl.
 *C09D 133/14* (2006.01)
 *G02B 1/14* (2015.01)
 *G02B 6/10* (2006.01)

(52) U.S. Cl.
 CPC ............. *C09D 133/14* (2013.01); *G02B 1/14* (2015.01); *G02B 6/10* (2013.01)

(58) Field of Classification Search
 CPC ........... C09D 133/14; G02B 1/14; G02B 6/10
 See application file for complete search history.

(56) References Cited

U.S. PATENT DOCUMENTS

| 9,006,364 | B2 * | 4/2015 | Van Gemert | ...... | C08G 18/4277 |
| | | | | | 526/260 |
| 2004/0034190 | A1 | 2/2004 | Janssen et al. | | |
| 2007/0093639 | A1 * | 4/2007 | Jassen | ................ | C08G 18/4837 |
| | | | | | 528/327 |
| 2017/0233600 | A1 | 8/2017 | Botelho et al. | | |
| 2019/0256658 | A1 * | 8/2019 | Odle | .................. | C08G 73/1017 |

FOREIGN PATENT DOCUMENTS

| WO | 2016126102 A1 | 8/2016 |
| WO | 2018028365 A1 | 2/2018 |

OTHER PUBLICATIONS

Yamauchi et al., "Combinations of Microphase Separation and Terminal Multiple Hydrogen Bonding in Novel Macromolecules," J Am Chem Soc, 2002, 124, 8599-8604; published online Jun. 28, 2002. (Year: 2002).*
Heinzmann et al. "Supramolecular Cross-inks in Poly(alkyl methacrylate) Copolymers and Their Impact on the Mechanical and Reversible Adhesive Properties", Appl. Mater. Interfaces, 2015, 7, 13395-13404; published online Jun. 5, 2015 (Year: 2015).*
Heinzmann et al. "Supramolecular Polymer Networks Made by Solvent-Free Copolymerization of a Liquid 2-Ureido-4[1H]-pyrimidinone Methacrylamide", Macromolecules, 2015, 48, 8128-8136; published online Oct. 30, 2015 (Year: 2015).*
Yamauchi et al. "Thermoreversible Poly(alkyl acrylates) Consisting of Self-Complementary Multiple Hydrogen Bonding", Macromolecules, 2003, 36, 1083-1088; published online Jan. 30, 2003 (Year: 2003).*
McKee et al. "Influence of Random Branching on Multiple Hydrogen Bonding in Poly(alkyl methacrylate)s", Macromolecules, 2005, 38, 6015-6023; published online Jun. 17, 2005 (Year: 2005).*
Gao et al. "Properties of UV-cured self-healing coatings prepared with PCDL-based polyurethane containing multiple H-bonds", Progress in Organic Coatings 113(21) 2017, pp. 160-167.
Invitation To Pay Additional Fees and Partial Search Report of the European International Searching Authority; PCT/US2019/038973; dated Sep. 13, 2019, 15 Pgs.

* cited by examiner

*Primary Examiner* — Jane L Stanley
(74) *Attorney, Agent, or Firm* — Kevin L. Bray

(57) ABSTRACT

An optical fiber coating composition comprising: one or more monomers forming a first polymer chain and a second polymer chain upon polymerization; and one or more hydrogen bonding cross-linkers including a first molecule that covalently bonds to the first polymer chain during the polymerization and a second molecule that covalently bonds to the second polymer chain during the polymerization. The first molecule includes a first functional group. The second molecule includes a second functional group. The first functional group and the second functional group hydrogen bond to form three or more hydrogen bonds during the polymerization. The first functional group and the second functional group both can be a ureidopyrimidinone functional group. The first molecule and the second molecule can both be a ureidopyrimidinone (meth)acrylate. The one or more monomers can be mono-acrylate monomers, and the optical fiber coating composition can lack any multi-acrylate monomers.

14 Claims, No Drawings

OPTICAL FIBER COATING COMPOSITIONS WITH HYDROGEN BONDING, NON-COVALENT BONDING, CROSS-LINKERS

This application claims the benefit of priority to U.S. Provisional Application Ser. No. 62/697,507 filed on Jul. 13, 2018, the content of which is relied upon and incorporated herein by reference in its entirety.

BACKGROUND

This disclosure generally pertains to coatings and coating compositions for optical fiber. More specifically, this disclosure pertains to the use of hydrogen bonding cross-linking of polymer chains in a cured coating composition for optical fiber to provide desired tensile properties to the cured coating composition without the use of covalent cross-linking of the polymer chains. More specifically, this disclosure pertains to hydrogen bonding (non-covalent bonding) cross-linking ureidopyrimidinones as components of coatings and coating compositions for optical fiber. Most specifically, this disclosure pertains to non-covalent cross-linking ureidopyrimidinones as components of coatings and coating compositions for optical fiber that form hydrogen bonds between polymer chains of the coatings and coating compositions.

Optical fiber has many applications in the electronics and telecommunications industries. For example, the telecommunications industry uses optical fiber for voice, video, and data transmissions. Optical fiber often replaces existing copper wiring for various transmissions. Use of optical fiber is expected to increase as networks are expected to deliver increasing volumes of transmissions to residential and commercial customers.

Optical fiber is made of glass or other transparent materials. A polymeric coating is typically applied to the transparent material to protect the surface of the transparent material. Typically, the polymeric coating has two layers, which includes a primary coating and a secondary coating. The primary coating, which is also known as the inner primary coating, is typically applied directly to the transparent material. The primary coating, when cured, is typically soft, elastic, and compliant. The primary coating helps dissipate external forces during bending, cabling, and spooling, which prevents the external forces from transferring to the transparent material in a manner causing micro-bend light attenuation. The secondary coating, which is also known as the outer primary coating, is applied over the primary coating. The secondary coating, when cured, is typically harder than the primary coating and surrounds the primary coating. The secondary coating functions as a tough, protective outer layer that prevents damage to the transparent material during processing, handling, and use.

Optical fiber is conventionally produced by drawing the transparent material downward from a draw furnace along a linear pathway through multiple stages of production in a draw tower. After the transparent material is drawn from the draw furnace, the primary coating composition is applied to the transparent material and cured. The secondary coating composition is then applied over the primary coating and cured. The coating compositions are cured on-line with ultraviolet light in a continuous process of drawing, coating, and curing. The resulting optical fiber is then wound onto reels for storage.

The primary coating, in some embodiments, can possess certain desirable properties. In some cases, it is advantageous for the primary coating to have a Young's modulus value of less than 1 MPa or even less than 0.5 MPa. In some cases, it is advantageous for the glass transition temperature to be as low as possible, so that the primary coating remains soft when the optical fiber is subjected to colder temperatures. Because of the continuous drawing, coating, and curing process of making optical fiber, it is advantageous in some cases for the primary coating composition to change quickly during curing from liquid state to a sufficiently solid state to support application of the secondary coating composition. In some cases, it is advantageous for the primary coating to have a sufficiently high tensile strength to prevent tearing during further processing and use of the optical fiber.

Mixtures of ultraviolet light curable urethane-acrylate oligomers and acrylate functional diluents have been developed that provide the aforementioned potentially desirable properties for the primary coating. Upon exposure to the ultraviolet light (and in the presence of a photo-initiator), the acrylate groups rapidly polymerize to form a cross-linked polymer network, which is further strengthened by the hydrogen bonding interactions between urethane groups along the oligomer backbone. Varying the urethane-acrylate oligomer achieves different property targets for the primary coating, including a primary coating with a low modulus value but sufficiently high tensile strength.

These urethane-acrylate solutions for the primary coating typically utilize covalent cross-linkers to impart the desired tensile strength to the cured primary coating. Di-, tri-, and other multi-acrylate species are typically utilized as such cross-linkers. Utilizing diacrylate species as the cross-linker can pose problems, however, related to achieving the desired balance between Young's modulus value and tensile strength. In some circumstances, the use of multi-acrylate species to impart covalently bonded cross-linking between polymer chains might not be desired at all.

SUMMARY

The present disclosure overcomes the problems posed by using di-, tri-, and multi-acrylate species to covalently cross-link the primary coating polymer chains, by instead utilizing molecules containing a functional group that forms hydrogen bonds between polymer chains of the primary coating with sufficient bonding strength to cross-link the polymer chains without the use of covalent bonding cross-linkers. The cross-linking of the polymer chains that the hydrogen bonding provides, if strong enough, results in a cured coating composition with sufficiently high tensile strength and sufficiently low Young's modulus values to be utilized as a primary coating for optical fiber. In some embodiments, functional groups that provide triple hydrogen bond cross-linking between polymer chains are sufficiently strong so that covalent cross-linkers can be omitted. In other embodiments, functional groups that provide quadruple or greater hydrogen bond cross-linking between polymer chains are sufficiently strong so that covalent cross-linkers can be omitted. The functional groups forming the hydrogen bonds between polymer chains, in some embodiments, are self-complementary, and in some embodiments, are not self-complementary.

In particular, molecules that include the ureidopyrimidinone functional group form self-complementary quadruple hydrogen bonds between polymer chains in the primary coating. The embodiments of the primary coating composition of the present disclosure that utilize ureidopyrimidinone functional groups to provide hydrogen bonding between polymer chains can be free of any traditional covalently bonding cross-linkers such as diacrylate species. The self-complementary quadruple hydrogen bonding that the ureidopyrimidinone functional groups provide results in a primary coating that meets desired Young's modulus and tensile strength properties.

According to one embodiment, an optical fiber coating composition comprises: one or more monomers, the one or more monomers forming a first polymer chain and a second polymer chain upon polymerization; and one or more hydrogen bonding cross-linkers including a first molecule that covalently bonds to the first polymer chain during the polymerization and a second molecule that covalently bonds to the second polymer chain during the polymerization; wherein, the first molecule includes a first functional group and the second molecule includes a second functional group, the first functional group and the second functional group hydrogen bonding to form three or more hydrogen bonds during the polymerization. In an embodiment, the first functional group and the second functional group are each a ureidopyrimidinone functional group, and the first molecule and the second molecule each have the general formula (II) below, wherein R1 is not hydrogen, and R1 of the first molecule and R1 of the second molecule are the same or different. In an embodiment, R1 of the general formula (II) comprises an acrylate group or a methacrylate group. In an embodiment, the first molecule and the second molecule have the general formula (VI) below, wherein, X is not hydrogen, and Y is hydrogen or a methyl group, and Z is oxygen or $CH_2$; and wherein X, Y, and Z for the first molecule and X, Y, Z for the second molecule are the same or different. In an embodiment, the first functional group and the second functional group are different. In an embodiment, one or both of the first molecule and the second molecule have the general formula (VII) below, wherein, $X_1$ is not hydrogen and can be any organic, $Y_1$ can be hydrogen or a methyl group, and n is an integer. In an embodiment, one or both of the first molecule and the second molecule have the general formula of the product of reaction equation (XIII) below. In an embodiment, one or both of the first molecule and the second molecule have the general formula of the product of reaction equation (XIV) below, wherein, n is an integer. In an embodiment, one or both of the first molecule and the second molecule have the general formula of the product of reaction equation (XVI) below, wherein, n is an integer. In an embodiment, one or both of the first molecule and the second molecule have the general formula of the product of reaction equation (XVII) below, wherein, n is an integer. In an embodiment, the optical fiber coating composition further comprises a co-polymer of ethylene and vinyl acetate. In an embodiment, the one or more monomers are 39 to 89 percent by weight of the optical fiber coating composition. In an embodiment, the one or more hydrogen bonding cross-linkers are 4 to 15 percent by weight of the optical fiber coating composition. In an embodiment, the one or more monomers are 39 to 89 percent by weight of the optical fiber coating composition, the one or more hydrogen bonding cross-linkers are 4 to 15 percent by weight of the optical fiber coating composition, and the optical fiber coating composition further comprises 20 to 50 percent by weight of non-reactive urethane oligomers. In an embodiment, the one or more monomers are mono-acrylate monomers, and the optical fiber coating composition does not include any multiple-acrylate monomers. In an embodiment, the one or more monomers includes a radiation-curable monomer. In an embodiment, the radiation-curable monomer is a (meth)acrylate monomer. In an embodiment, the optical fiber coating composition further comprises a photoinitiator. In an embodiment, the first functional group comprises two hydrogen donor groups, and the second functional group comprises a hydrogen acceptor group. In an embodiment, the second functional group comprises two hydrogen acceptor groups. In an embodiment, the first functional group comprises a hydrogen acceptor group and the second functional group comprises a hydrogen donor group. In an embodiment, the first functional group comprises two hydrogen acceptor groups and the second functional group comprises two hydrogen donor groups. In an embodiment, the first functional group comprises an equal number of hydrogen acceptor groups and hydrogen donor groups, and the second functional group comprises an equal number of hydrogen acceptor groups and hydrogen acceptor groups. In an embodiment, the first functional group and the second functional group are terminal functional groups. In an embodiment, the first functional group and the second functional group hydrogen bond to form four or more hydrogen bonds during the polymerization. In an embodiment the first molecule comprises a (meth)acrylate group. In an embodiment, the second molecule comprises a (meth)acrylate group. In an embodiment, the optical fiber coating composition is cured into a cured product.

According to another embodiment, an optical fiber coating composition comprises: one or more monomers, the one or more monomers forming a first polymer chain and a second polymer chain upon polymerization; a first molecule, the first molecule including a first ureidopyrimidinone functional group and covalently bonding to the first polymer chain during the polymerization; a second molecule, the second molecule including a second ureidopyrimidinone functional group and covalently bonding to the second polymer chain during the polymerization; and a third molecule, the third molecule including a third ureidopyrimidinone functional group and a fourth ureidopyrimidinone functional group, the third ureidopyrimidinone functional group hydrogen bonding with the first ureidopyrimidinone functional group during the polymerization and the fourth ureidopyrimidinone functional group hydrogen bonding with the second ureidopyrimidinone functional group during the polymerization. In an embodiment, the first molecule and the second molecule each have the general formula (II) below, wherein, R1 is not hydrogen, and R1 for the first molecule and R1 for the second molecule are the same or different. In an embodiment, the third molecule has the general formula (IX) below, wherein, X is not hydrogen. In an embodiment, the third molecule has the general formula (XI) below, wherein, X is not hydrogen. In an embodiment, the first molecule is a ureidopyrimidinone acrylate, the second molecule is a ureidopyrimidinone acrylate, and the third molecule has the general formula (X) below wherein, n is an integer.

According to still another embodiment, a method of manufacturing an optical fiber comprises: applying a coating composition to an optical fiber. The coating composition comprises: one or more monomers, the one or more monomers forming a first polymer chain and a second polymer chain upon polymerization; and one or more hydrogen bonding cross-linkers. The one or more hydrogen bonding cross-linkers include: a first molecule, the first molecule including a ureidopyrimidinone functional group and covalently bonding to the first polymer chain during the polymerization; a second molecule, the second molecule including a ureidopyrimidinone functional group and covalently bonding to the second polymer chain during the polymerization. The ureidopyrimidinone functional group of the first molecule and the ureidopyrimidinone functional group of the second molecule hydrogen bond to form a quadruple hydrogen bond. The first molecule and the second molecule each have the general formula (II) below, wherein, R1 is not hydrogen, and R1 for the first molecule and R1 for the second molecule can be the same or can be different. In an embodiment, R1 for one or more both of the first molecule and the second molecule comprises an acrylate group. In an embodiment, the coating composition comprises 20 to 95 percent by weight of the one or more monomers and 2 to 30 percent by weight of the one or more hydrogen bonding cross-linkers.

According to still another embodiment, an optical fiber coating composition comprises: a radiation-curable monomer; and a hydrogen bonding cross-linker comprising a molecule having a ureidopyrimidinone functional group. In an embodiment, the optical fiber coating composition further comprises a photoinitiator. In an embodiment, the hydrogen bonding cross-linker comprises two ureidopyrimidinone functional groups.

According to still another embodiment, an optical fiber comprises a coating. The coating comprises: a first polymer chain comprising a first ureidopyrimidinone functional group; and a second polymer chain comprising a second ureidopyrimidinone functional group. In an embodiment, the first ureidopyrimidinone functional group is hydrogen bonded to the second ureidopyrimidinone functional group.

Additional features and advantages will be set forth in the detailed description which follows, and in part will be readily apparent to those skilled in the art from that description or recognized by practicing the embodiments as described herein, including the detailed description and the claims, which follow.

It is to be understood that both the foregoing general description and the following detailed description are merely exemplary, and are intended to provide an overview or framework to understanding the nature and character of the claims.

DETAILED DESCRIPTION

Disclosed herein is an optical fiber coating composition. The optical fiber coating composition includes one or more monomers that are capable of undergoing, and do undergo, polymerization. The polymerization forms polymer chains. The polymer chains include a first polymer chain and a second polymer chain, among many more polymer chains upon polymerization. In other words, the one or more monomers form a first polymer chain and a second polymer chain, among many more polymer chains, upon polymerization.

The optical fiber coating composition further includes one or more hydrogen bonding cross-linkers. The hydrogen bonding cross-linkers include molecules that integrate into the polymer chains formed during the polymerization of the monomers. In a preferred embodiment, molecules that integrate into a polymer chain covalently bond to a polymer chain during polymerization. For example, the hydrogen bonding cross-linkers include a first molecule that integrates into (e.g., covalently bonds to) the first polymer chain during the polymerization and a second molecule that integrates into (e.g., covalently bonds to) the second polymer chain during the polymerization. The hydrogen bonding cross-linkers are pendent groups that extend from polymer chains. The hydrogen bonding cross-linkers, including the first molecule and the second molecule, include a functional group or functional groups with hydrogen donors and hydrogen acceptors that form triple or greater (three or more) hydrogen bonds between the polymer chains during the polymerization. In other words, the first molecule includes a first functional group and the second molecule includes a second functional group, the first functional group and the second functional group hydrogen bonding to form three or more hydrogen bonds during the polymerization. The hydrogen bonding cross-linkers covalently bond to the polymer chains (including the first molecule and the second molecule covalently bonding to the first polymer chain and the second polymer chain, respectively) in a manner that keeps the hydrogen bonding functional groups free to form hydrogen bonds. In one embodiment, the functional group that forms three or more hydrogen bonds is a terminal functional group of a molecule. An example of a first functional group of a first molecule covalently bonded to a first polymer chain, and a second functional group of a second molecule covalently bonded to a second polymer chain, hydrogen bonding to form three hydrogen bonds during the polymerization between the first polymer chain and the second polymer chain is illustrated below in general formula (I):

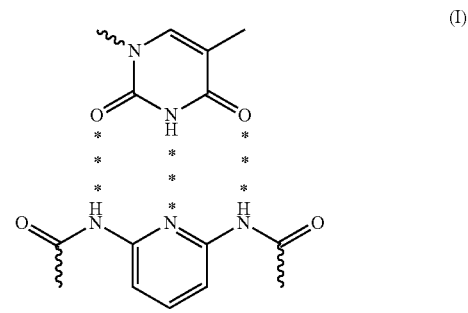

The upper functional group can be thought of as the first functional group of the first molecule covalently bonded into a first polymer chain, and the lower functional group can be thought of as the second functional group of the second molecule covalently bonded into the second polymer chain, with the first functional group forming three hydrogen bonds with the second functional group. In general formula (I), the —NH groups are hydrogen donor groups and the groups to which the —NH groups are hydrogen bonded (oxygen in a ketone group and nitrogen atom with double bond) are hydrogen acceptor groups. The upper (first) functional group in formula (I) includes a hydrogen donor group between two hydrogen acceptor groups and the lower (second) functional group of formula (I) includes a hydrogen acceptor group between two hydrogen donor groups. Hydrogen bonding cross-linkers that include a functional group or functional groups that form three or more hydrogen bonds between the polymer chains, in many cases, cross-link the polymer chains strongly enough to provide the coating with adequate tensile properties for use as an optical fiber coating. In an embodiment, the first functional group of the first molecule and the second functional group of the second molecule are different and form a non-self-complementary triple hydrogen bond between the first polymer chain and the second polymer chain. In general formula (I) above, the first functional group and the second functional group are different.

As an alternative to triple hydrogen bonds, the first functional group of the first molecule and the second functional group of the second molecule form four (i.e., quadruple) hydrogen bonds between the first polymer chain and the second polymer chain during polymerization. One particular hydrogen bonding cross-linker that includes a functional group that forms quadruple hydrogen bonds between the polymer chains is a molecule that includes a ureidopyrimidinone functional group. In an embodiment, the first functional group and the second functional group (forming four hydrogen bonds) are each a ureidopyrimidinone functional group, and the first molecule and the second molecule each have the general formula (II):

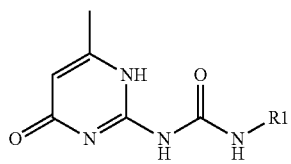

(II)

wherein, R1 is not hydrogen. In formula (II), the ureidopyrimidinone functional group is a terminal functional group and the R1 is the remainder of the molecule to which the ureidopyrimidinone functional group belongs. R1 of the first molecule and the second molecule can be the same or can be different. In some embodiments, R1 includes an acrylate group or a methacrylate group, both of which can be terminal groups. The ureidopyrimidinone functional group includes two hydrogen donor groups (—NH) and two hydrogen acceptor groups (one being the oxygen in the ketone group of the ring and the second being the double bonded nitrogen atom of the ring) that form hydrogen bonds, as shown below in formula (III), with a second ureidopyrimidinone functional group of a second molecule integrated into a second polymer chain.

Molecules including the ureidopyrimidinone functional group, and other quadruple hydrogen bond forming functional groups, after integration into the polymer chains, form self-complementary quadruple hydrogen bonds. The quadruple hydrogen bonded dimer assembly of two ureidopyrimidinone functional groups, one integrated into one polymer chain and the other integrated into another polymer chain, is illustrated below in formula (III), as follows:

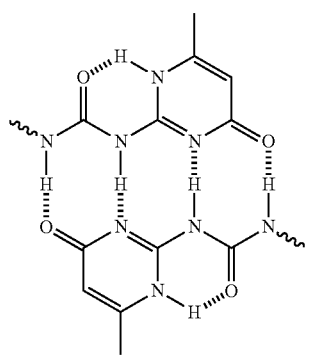

(III)

The upper ureidopyrimidinone functional group can be thought of as the first functional group of the first molecule covalently bonded into the first polymer chain, and the lower ureidopyrimidinone functional group can be thought of as the second functional group of the second molecule covalently bonded into the second polymer chain, with the first functional group forming four hydrogen bonds with the second functional group. As a result of polymerization, the first polymer chain thus includes (via covalent bonding) the first molecule with the first ureidopyrimidinone functional group, and the second polymer chain thus includes (via covalent bonding) the second molecule with the second ureidopyrimidinone functional group. Further, the first ureidopyrimidinone functional group is hydrogen bonded to the second ureidopyrimidinone functional group. Each ureidopyrimidinone functional group includes two hydrogen donor groups and two hydrogen acceptor groups. Two of the four hydrogen bonds of the quadruple hydrogen bond are formed between hydrogen acceptor groups of the first ureidopyrimidinone functional group integrated with a first polymer chain and hydrogen donor groups of a second ureidopyrimidinone functional group integrated with a second polymer chain, and two of the four hydrogen bonds of the quadruple hydrogen bond are formed between hydrogen donor groups of the first ureidopyrimidinone functional group integrated with the first polymer chain and hydrogen acceptor groups of the second ureidopyrimidinone functional group integrated with the second polymer chain. By self-complementary, it is meant that one ureidopyrimidinone functional group, integrated into one polymer chain, forms a quadruple hydrogen bond with another ureidopyrimidinone functional group, integrated into another polymer chain, eliminating the need to account for stoichiometric ratios. The need to account for stoichiometric ratios arises if two different hydrogen bonding functional groups are utilized. To be self-complementary, a functional group must have equal numbers of hydrogen donor groups and hydrogen acceptor groups. Functional groups that form triple hydrogen bonds between polymer chains (e.g. the functional groups of formula (I)) are not self-complementary because they contain different numbers of hydrogen donor groups and hydrogen acceptors groups (e.g. one functional group of formula (I) includes two hydrogen acceptor groups and one hydrogen donor group, while the other functional group of formula (I) includes two hydrogen donor groups and one hydrogen acceptor group).

The hydrogen bonding cross-linker includes a functional group with a hydrogen donor group, a hydrogen acceptor group, and at least one other group that is a hydrogen donor group or a hydrogen acceptor group. For example, the functional group of the hydrogen bonding cross-linker includes two hydrogen donor groups and a hydrogen acceptor group, or two hydrogen acceptor groups and a hydrogen donor group. In certain embodiments, the functional group of the hydrogen cross-linker includes two or more hydrogen donor groups and two or more hydrogen acceptor groups. In further embodiments, the functional group of the hydrogen cross-linker includes equal numbers of hydrogen donor groups and hydrogen acceptor groups.

The monomers of the one or monomers are curable monomers. Curable monomers are monomers that react to form polymer chains (such as the first polymer chain and the second polymer chain) when excited by curing energy. Curing energy is thermal energy or electromagnetic energy. Electromagnetic energy is the preferred curing energy. Monomers curable with UV (ultraviolet) radiation are especially preferred. Monomers curable with radiation are referred to herein as radiation-curable monomers.

The one or more monomers can be between and including 20 to 95 percent by weight of the coating composition. In some embodiments, the one or more monomers are 39 to 89 percent by weight of the composition. The one or more monomers can be any monomer capable of undergoing polymerization. In some embodiments, the one or more monomers capable of undergoing polymerization to form polymer chains (including the first polymer chain and the second polymer chain) are mono(meth)acrylate monomers. As used herein, "(meth)acrylate" means acrylate or methacrylate. Mono(meth)acrylate monomers include one and only one (meth)acrylate functional group. A (meth)acrylate functional group is a radiation-curable functional group and is curable with UV radiation. Examples of radiation-curable mono(meth)acrylate monomers include an alkoxylated lauryl acrylate monomer (more specifically, CD9075 (ethoxylated (4) lauryl acrylate) available from Sartomer-Exton, Pa.), a caprolactone acrylate monomer (more specifically, SR495 (caprolactone acrylate) available from Sartomer-Exton, Pa.), a lauryl acrylate monomer (more specifically, SR335 (lauryl acrylate) available from Sartomer), a nonylphenol alkoxylated acrylate monomer (more specifically, Miramer M166 (ethoxylated (8) nonylphenol acrylate), available from Miwon Specialty Chemical Company, South Korea), and an ethoxylated nonyl-phenol acrylate monomer (more specifically, SR504 (ethoxylated (4) nonylphenol acrylate) available from Sartomer). In some embodiments, the one or more monomers are mono(meth)acrylate monomers, and the coating composition does not include any monomers with two or more (meth)acrylate groups. In some embodiments, the one or more monomers are mono-arcylate monomers, and the coating composition does not include any multi-acrylate monomers (i.e., any monomers with two or more acrylate groups).

The coating composition preferably includes a photoinitiator to initiate curing of radiation-curable monomers. Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof. The coating composition includes a single photoinitiator or a combination of two or more photoinitiators. The total photoinitiator concentration in the coating composition is greater than 0.25 wt %, or greater than 0.50 wt %, or greater than 0.75 wt %, or greater than 1.0 wt %, or in the range from 0.25 wt %-5.0 wt %, or in the range from 0.50 wt %-4.0 wt %, or in the range from 0.75 wt %-3.0 wt %.

A precursor to the synthesis of a molecule (such as the first molecule and the second molecule) containing the ureidopyrimidinone functional group can be a ureidopyrimidinone isocyanate. The ureidopyrimidinone isocyanate can be made according to the general reaction equation (IV) illustrated below, as follows:

(IV)

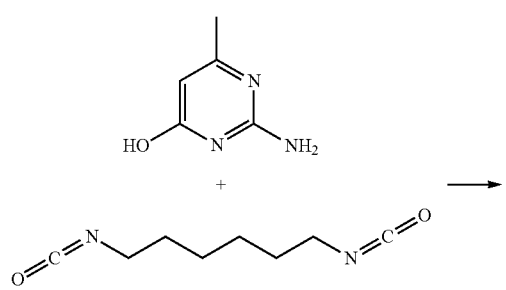

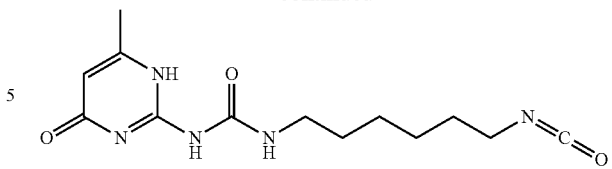

The ureidopyrimidinone isocyanate can be easily coupled to another species (e.g. a polymer chain) having a nucleophilic group to form a covalent bond.

For example, the ureidopyrimidinone isocyanate can be used to synthesize a ureidopyrimidinone (meth)acrylate, which are exemplary radiation-curable molecules that include hydrogen bonding (non-covalent) cross-linking ureidopyrimidinone functional groups as described herein. The (meth)acrylate group of a ureidopyrimidinone (meth)acrylate undergoes reaction with a photoinitiator in the photocuring of a mono(meth)acrylate monomer to become integrated into (covalently bonded to) a polymer chain formed from the mono(meth)acrylate monomer to provide a polymer chain having a pendent ureidopyrimidinone functional group. Reaction of a ureidopyrimidinone isocyanate with a hydroxy (meth)acrylate compound, for example, forms a ureidopyrimidinone (meth)acrylate. However, the ureidopyrimidinone (meth)acrylate for use in the optical fiber coating compositions described herein need not be synthesized from a ureidopyrimidinone isocyanate. Suitable ureidopyrimidinone (meth)acrylates to provide quadruple hydrogen bonding cross-linking between polymer chains of the optical fiber coating composition can be of the general formula (V), as follows:

(V)

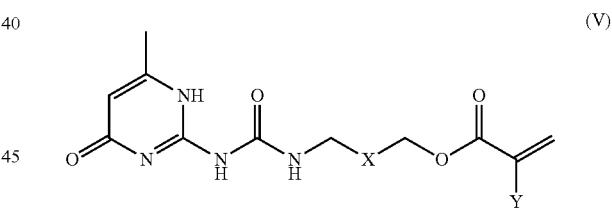

wherein, X is not hydrogen and can be any organic, and Y can be hydrogen or a methyl group. Assuming a first molecule according to general formula (V) is integrated into a first polymer chain, and another molecule according to general formula (V) is integrated into a second polymer chain, and the ureidopyrimidinone functional groups of the two molecules are hydrogen bonded to each other, the two molecules with the ureidopyrimidinone functional group need not be identical, with X and/or Y for the two molecules being different. The two molecules can be identical however. In formula (V), the ureidopyrimidinone functional group is a terminal functional group.

Other suitable ureidopyrimidinone (meth)acrylates to provide quadruple hydrogen bonding cross-linking between polymer chains of the optical fiber coating composition can be of the general formula (VI), as follows:

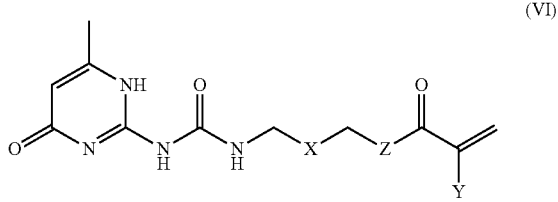

wherein, X is not hydrogen, and Y is hydrogen or a methyl group, and Z is oxygen or $CH_2$. Assuming a first molecule according to general formula (VI) is integrated into a first polymer chain, and a second molecule according to general formula (VI) is integrated into a second polymer chain, each having the ureidopyrimidinone functional group, and the ureidopyrimidinone functional groups of the first and second molecules hydrogen bond to each other, the first and second molecules with the ureidopyrimidinone functional group need not be identical, with X and/or Y and/or Z for the first and second molecules being different. The first and second molecules can be identical however. In formula (VI), the ureidopyrimidinone functional group is a terminal functional group.

Other suitable ureidopyrimidinone (meth)acrylates to provide quadruple hydrogen bonding cross-linking between polymer chains of the optical fiber coating composition can be of the general formula (VII), as follows:

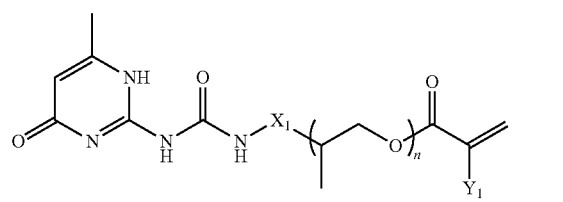

wherein, $X_1$ is not hydrogen and can be any organic, $Y_1$ can be hydrogen or a methyl group, and n is an integer. Again, assuming a first molecule according to general formula (VII) is integrated into a first polymer chain, and a second molecule according to general formula (VII) is integrated into a second polymer chain, and the ureidopyrimidinone functional groups of the first and second molecules are hydrogen bonded to each other, the first and second molecules with the ureidopyrimidinone functional group need not be identical, with $X_1$ and/or $Y_1$ for the first and second molecules being different. The first and second molecules can be identical however. In formula (VII), the ureidopyrimidinone functional group is a terminal functional group.

Other suitable ureidopyrimidinone (meth)acrylates to provide quadruple hydrogen bonding cross-linking between polymer chains of the optical fiber coating composition include isophorone-based ureidopyrimidinone PPG acrylates, isophorone-based ureidopyrimidinone PPG methacrylates, isophorone-based ureidopyrimidinone caprolactone acrylates, and isophorone-based ureidopyrimidinone caprolactone methacrylates. (PPG means polypropylene glycol.) This list is not exclusive.

The one or more hydrogen bonding cross-linkers can be between and including 2 to 30 percent by weight of the coating composition. In some embodiments, the one or more by hydrogen bonding cross-linkers are between and including 4 to 15 percent by weight of the composition.

As explained above, a first molecule that includes a ureidopyrimidinone functional group, when integrated into a first polymer chain, forms a hydrogen bonded, non-covalent, cross-link with a second ureidopyrimidinone functional group of a second molecule integrated into a second polymer chain. In addition, the optical fiber coating composition including the first molecule and the second molecule (and the one or more monomers) can further include a third molecule with multiple ureidopyrimidinone functional groups (such as a third ureidopyrimidinone functional group and a fourth ureidopyrimidinone functional group) covalently bonded into the third molecule. The third molecule with multiple ureidopyrimidinone functional groups creates an extended hydrogen bonded network, with the multiple ureidopyrimidinone functional groups of the third molecule hydrogen bonded between the first molecule and the second molecule. For example, concerning the third molecule with the third ureidopyrimidinone functional group and the fourth ureidopyrimidinone functional group, the third ureidopyrimidinone functional group hydrogen bonds with the first ureidopyrimidinone functional group of the first molecule during polymerization, and the fourth ureidopyrimidinone functional group hydrogen bonds with the second ureidopyrimidinone functional group of the second molecule during polymerization. Such is illustrated below in the general hydrogen bonded structure (VIII)

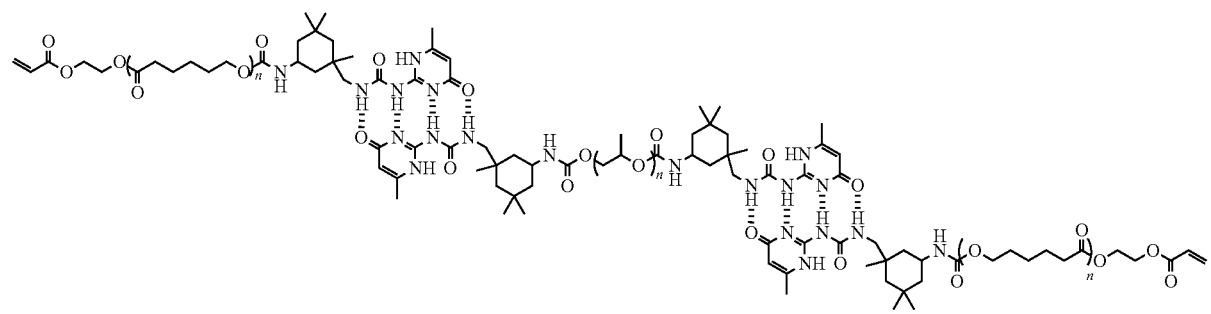

The first molecule and the second molecule each containing the solitary ureidopyrimidinone functional group then integrate into first and second polymer chains, respectively, during polymerization. The third molecule, including multiple ureidopyrimidinone functional groups covalently bonded into the molecule, form an extended hydrogen bond network between the ureidopyrimidinone functional group of the first molecule integrated into the first polymer chain and the ureidopyrimidinone functional group of the second molecule integrated into the second polymer chain. The extended hydrogen bonded network can be tuned to various effective lengths by choice of linker length (i.e., the length of the third molecule with multiple ureidopyrimidinone functional groups covalently bonded into the third molecule). In addition, the degree of cross-linking can be tuned by changing the number of ureidopyrimidinone functional groups covalently bonded into the third molecule.

In this regard, two ureidopyrimidinone functional groups can be covalently bonded into a bis-ureidopyrimidinone molecule, which is represented by the general formula (IX) below:

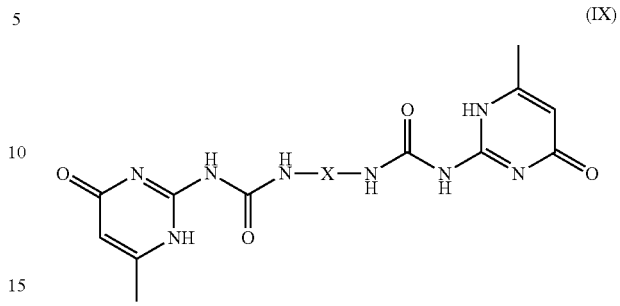

(IX)

wherein, X is not hydrogen. The bis-ureidopyrimidinone molecule can be added as the third molecule to the first and second molecules that each include a ureidopyrimidinone functional group in order to form an extended hydrogen bond network between the first and second molecules when the first and second molecules integrate into first and second polymer chains, respectively. An example bis-ureidopyrimidinone can be created using a diol such as propyleneglycol as the central species, as in the general formula (X) below:

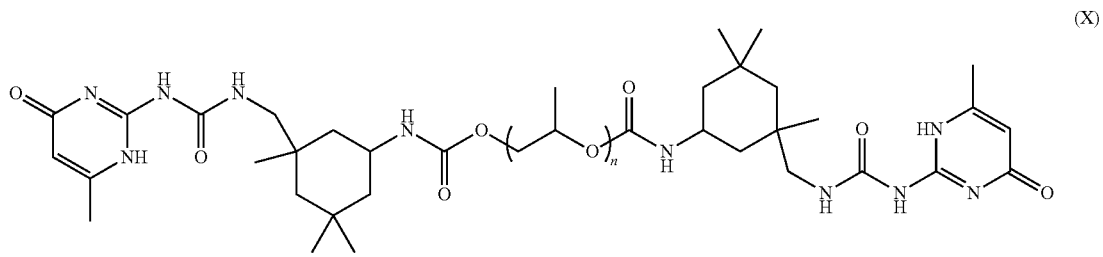

(X)

wherein, n is an integer. In some embodiments, a bis-ureidopyrimidinone molecule of formula (X) is the third molecule that forms an extended hydrogen bond network between a first molecule that is a ureidopyrimidinone acrylate and a second molecule that is a ureidopyrimidinone acrylate, which first and second molecules integrate into first and second polymer chains, respectively, during polymerization.

In addition to a bis-ureidopyrimidinone, a tris-ureidopyrimidinone can be created as represented below in the general formula (XI):

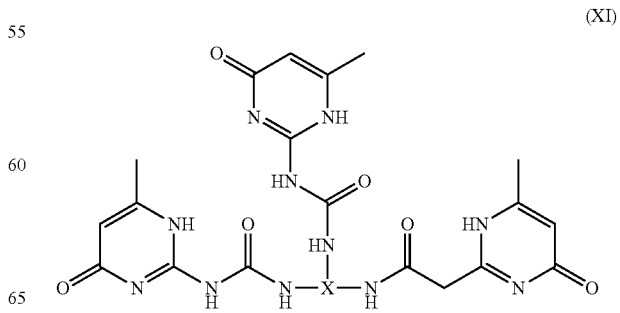

(XI)

wherein, X is not hydrogen. An example tris-ureidopyrimidinone, which increases the degree of cross-linking compared to a bis-ureidopyrimidinone, can be created using a triol such as glycerol as the central species, as in the general formula (XII) as follows:

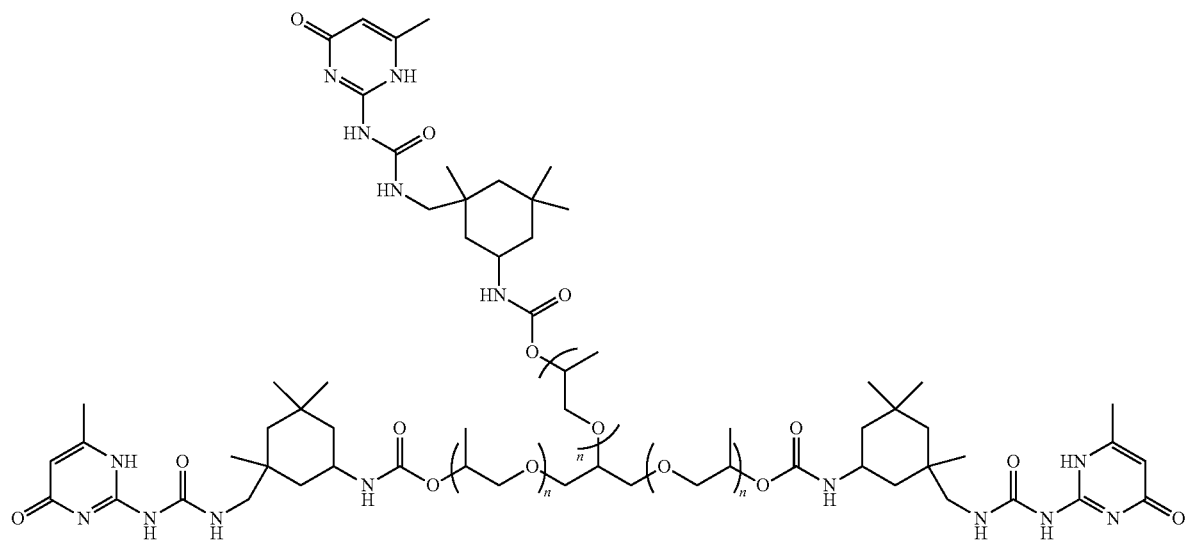

(XII)

wherein, n is an integer. The tris-ureidopyrimidinone molecule forms an extended hydrogen bond network between three molecules, each containing a ureidopyrimidinone functional group, each of the three molecules being integrated into first, second, and third polymer chains, respectively, during polymerization.

In some embodiments, the coating composition further includes one or more of photo-initiators, elastomers (such as an ethylene vinyl acetate elastomer, which is a co-polymer of ethylene and vinyl acetate), non-reactive urethane oligomers (in some embodiments, between 30 to 50 percent by weight of the coating composition), among other components.

Further disclosed herein is a novel method of manufacturing an optical fiber with the hydrogen bonding cross-linkers including a functional group or functional groups that form self-complementary quadruple or greater hydrogen bonds between polymer chains, as described herein. The method includes applying a coating composition as described herein to an optical fiber. The polymerization of the monomers and integration of the molecules that include the hydrogen bonding functional groups can occur during a curing step, which can be initiated via ultraviolet light. The coating composition applied can be the primary coating applied directly over the transparent material or the secondary coating applied over a primary coating.

Example 1—A Ureidopyrimidinone Acrylate

A ureidopyrimidinone acrylate was synthesized from a ureidopyrimidinone isocyanate, according to the general reaction equation (XIII) below.

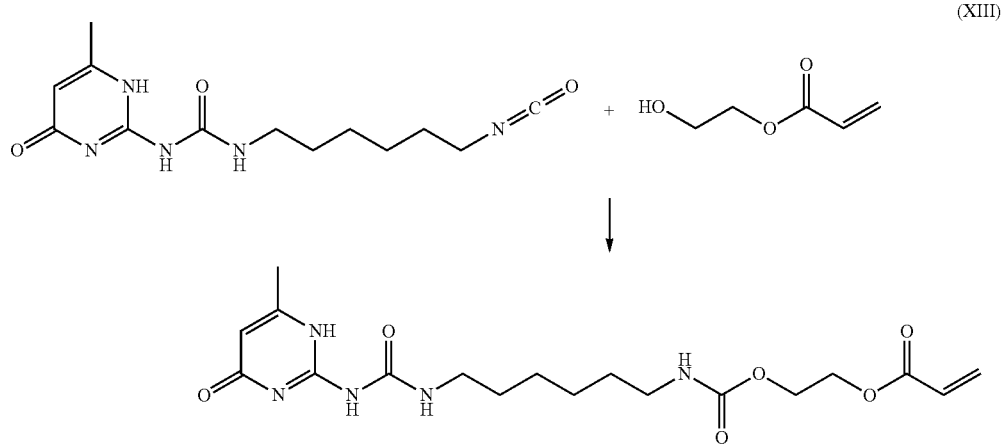

(XIII)

More specifically, 2.80 grams of the ureidopyrimidinone isocyanate (6-isocyanatohexyl-6-methylureidopyrimidinone) was dissolved in 100 mL of chloroform (Aldrich 650498) in a 250 mL round-bottom flask. One gram (1 g) of hydroxyethylacrylate (Aldrich 292818) and 50 µL of dibutyltindilaurate (Aldrich 291234) were added to the round-bottom flask. The contents of the round-bottom flask were stirred in a 90° C. oil bath overnight. Five grams (5 g) of silica gel was added to the contents of the round-bottom flask, and the contents were stirred for an additional 3 hours. The contents were then cooled to room temperature and filtered. The solvent was removed under reduced pressure, leaving the ureidopyrimidinone acrylate. In some aspects, the resulting ureidopyrimidinone acrylate produced through reaction equation (XIII) is suitable as a hydrogen bonding cross-linker of the optical fiber coating composition of the present disclosure. In other aspects, the resulting ureidopyrimidinone acrylate was considered to be a suitable hydrogen bonding cross-linker of the optical fiber coating composition of the present disclosure. In other words, in the optical fiber coating compositions of the present disclosure, one or both of the first molecule (that covalently bonds to a first polymer chain during polymerization) and the second molecule (that covalently bonds to a second polymer chain during the polymerization), with the ureidopyrimidinone functional groups of the first molecule and the second molecule hydrogen bonding to each other during the polymerization, can have the general formula of the product of reaction equation (XIII).

wherein, n is an integer. More specifically, 3.08 grams of the ureidopyrimidinone isocyanate (6-isocyanatohexyl-6-methylureidopyrimidinone) was dissolved in 200 mL of chloroform (Aldrich 650498) in a 500 mL round-bottom flask. Next, 4.75 grams of a PPG acrylate (Aldrich 292818, Mn~475) and 50 µL dibutyltindilaurate (Aldrich 291234) were added to the contents of the round-bottom flask. The contents of the round-bottom flask were stirred in a 60° C. oil bath overnight. Five grams (5 g) of silica gel was added to the contents of the round-bottom flask, and the contents were stirred for an additional 3 hours. The contents were then cooled to room temperature and filtered. The solvent was removed under reduced pressure, leaving the longer ureidopyrimidinone acrylate with a short PPG segment. The ureidopyrimidinone acrylate reaction product of reaction equation (XIV) has better solubility or miscibility than the ureidopyrimidinone acrylate reaction product of reaction equation (XIII) in many acrylate monomers. In other aspects, the resulting ureidopyrimidinone acrylate was considered to be a suitable hydrogen bonding cross-linker of the optical fiber coating composition of the present disclosure. In other words, in the optical fiber coating compositions of the present disclosure, one or both of the first molecule (that covalently bonds to a first polymer chain during polymerization) and the second molecule (that covalently bonds to a second polymer chain during the polymerization), with the ureidopyrimidinone functional groups of the first molecule and the second molecule hydrogen bonding to each other during the polymerization, can have the general formula of the product of reaction equation (XIV).

Example 2—Ureidopyrimidinone Acrylate with a PPG Segment

A longer ureidopyrimidinone acrylate with a short PPG segment (molecular weight of approximately 475) was synthesized from a ureidopyrimidinone isocyanate, according to the reaction equation (XIV), as follows:

Example 3—Isophorone-Based Ureidopyrimidinone PPG Acrylate

In the third example, a cyclic isophorone species was substituted between the ureidopyrimidinone and the PPG-segmented (meth)acrylate moieties. As a precursor, an isophorone-based ureidopyrimidinone isocyanate was synthesized according to the general reaction (XV), as follows:

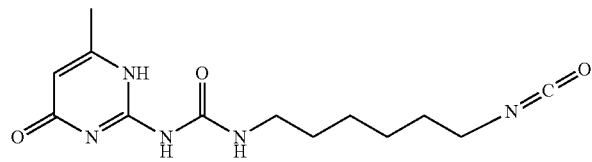

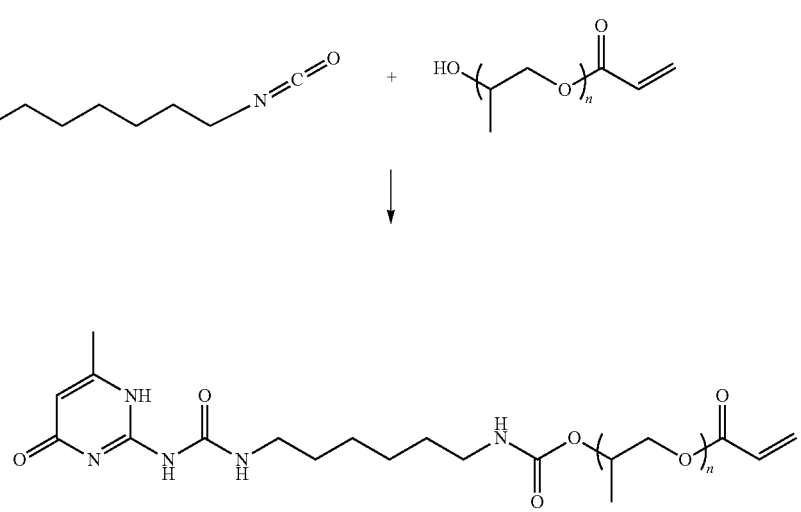

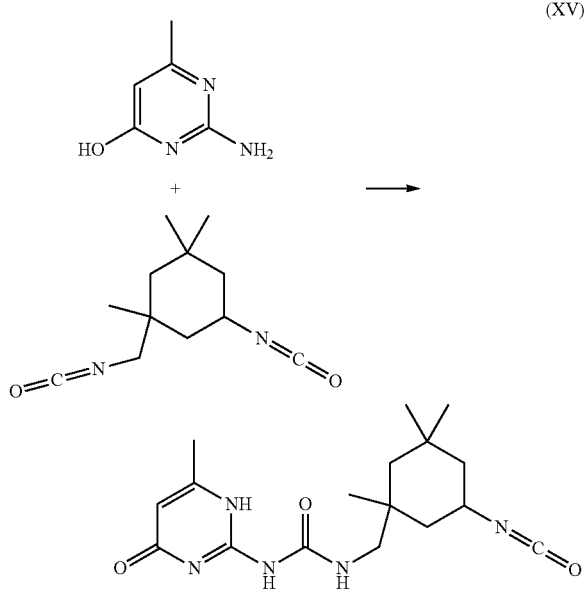

(XV)

More specifically, 25 grams of 2-Amino-4-hydroxy-6-methylpyrimidine (Aldrich A58003) was added to a 1000 mL round-bottom flask. Next, 250 mL of the isophorone diisocyanate (Aldrich 317624) and 16.3 mL of pyridine (Acros 61044-0010) were added to the flask. A condenser was fit and the flask attached to a nitrogen manifold. The contents were stirred overnight under nitrogen in an oil bath at 100° C. The contents were cooled to room temperature. Pentane (Fisher 04262), 500 mL, was added to the flask while stirring. The contents were cooled via ice bath to promote precipitation of the isophorone-based ureidopyrimidinone isocynate. The suspended product was filtered and washed twice with 100 mL of pentane, and then dried under vacuum.

As in reaction equation (XIV), the isophorone-based ureidopyrimidinone isocyanate product of equation (XV) can be reacted with a PPG acrylate to form a hydrogen bonding (non-covalent) cross-linking isophorone-based ureidopyrimidinone PPG acrylate. The isophorone-based ureidopyrimidinone PPG acrylate can be prepared using an isophorone-based ureidopyrimidinone isocyanate of reaction (XV), as set forth below in general reaction (XVI):

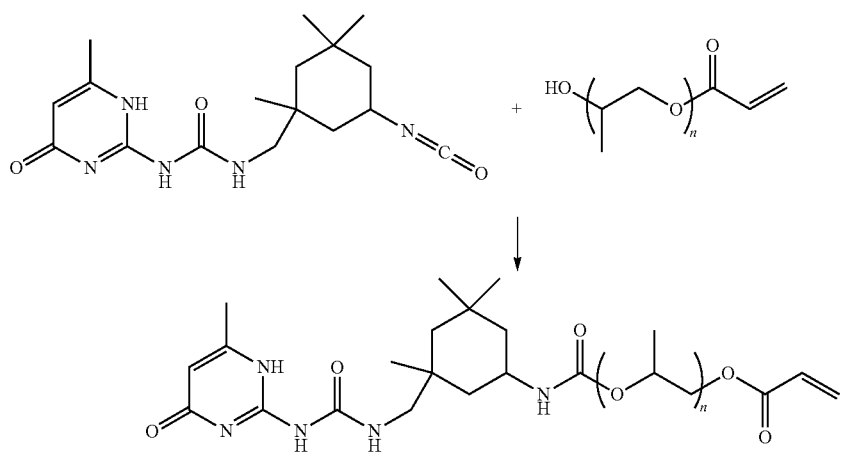

(XVI)

wherein, n is an integer. More specifically, 35.0 grams of the isophorone-based ureidopyrimidinone isocyanate of reaction (XV) was dissolved in 2000 mL of chloroform (Aldrich 650498) in a 2000 mL round-bottom flask. Then, 47.9 grams of PPG acrylate (Aldrich 292818, Mn~475) and 0.5 mL of dibutyltindilaurate (Aldrich 291234) were added to the flask. The contents of the flask were stirred in a 60° C. oil bath overnight. Then, 20 grams of silica gel was added to the flask and the contents stirred for 3 hours. The contents of the flask were cooled to room temperature and then filtered. The solvent was removed under reduced pressure to provide the isophorone-based ureidopyrimidinone PPG acrylate product of reaction (XVI).

Various weight percentages of the isophorone-based ureidopyrimidinone PPG acrylate product of reaction (XVI) above were utilized in optical fiber coating compositions. The formulations of the compositions are set forth in the table below.

| Comp. | Cov. Cross-linker (% by wt.) | Elast. (% by wt.) | UPy (% by wt.) | Mon - 1 (% by wt.) | Mon - 2 (% by wt.) | Tensile Str. (MPa) | Percent Elong. | Young's Mod. (MPa) |
|---|---|---|---|---|---|---|---|---|
| 1 | 1 | 15 | 1 | 75 | 5 | 0.25 | 340 | 0.20 |
| 2 | 1 | 15 | 3 | 73 | 5 | 0.27 | 230 | 0.25 |
| 3 | 1 | 15 | 5 | 71 | 5 | 0.44 | 220 | 0.44 |
| 4 | 1 | 15 | 7 | 69 | 5 | 0.46 | 180 | 0.49 |
| 5 | 1 | 15 | 9 | 67 | 5 | 0.51 | 150 | 0.56 |

Each composition further included 3 weight percent of a photoinitiator. In reference to the table above, "Comp." means "composition" and assigns an identification number to the particular coating composition formulation tested. "Coy. Cross-linker (% by wt.)" means the weight percentage of a covalent cross-linking diacrylate in the coating composition formulation tested (more specifically, SR508 (dipropylene glycol diacrylate) available from Sartomer-Exton, Pa.). In this initial set of testing, a small amount of this diacrylate cross-linker was added to provide a minimum structural integrity to the resulting cured coatings from the compositions to ensure suitability for testing, because it was unknown at the time what degree of structural integrity the isophorone-based ureidopyrimidinone PPG acrylate product of reaction (XVI) would provide to the resulting cured coating. "Elast. (% by wt.)" means the weight percentage of EVA (a co-polymer of ethylene and vinyl acetate) in the coating composition formulation tested, which was added to impart elastomeric properties to the cured coating composition. "UPy (% by wt.)" means the weight percentage of the isophorone-based ureidopyrimidinone PPG acrylate product of reaction (XVI) in the coating composition formulation tested. "Mon-1 (% by wt.)" means the weight percentage of a first monomer, in this instance an alkoxylated lauryl acrylate monomer (more specifically, CD9075 available from Sartomer-Exton, Pa.), in the coating composition formulation tested. "Mon-2 (% by wt.)" means the weight percentage of a second monomer, in this instance a caprolactone acrylate monomer (more specifically, SR495 available from Sartomer-Exton, Pa.), in the coating composition tested. "Tensile Str." means tensile strength of the cured coating composition from the coating composition formulation tested. "Percent Elong." means percent elongation at break of the cured coating composition from the coating composition formulation tested. "Young's Mod." means the Young's modulus value of the cured coating composition from the coating composition formulation tested.

For each composition, the components were weighed and placed into a 40 mL vial, with a stir bar added. The contents of all of the vials were stirred overnight in a 60° C. oil bath. The stir bars were removed. The vials were stored in an oven at 60° C. until the contents were used to make a film. To make the film, release paper was attached to a glass backing plate to ease handling. An 8 mil application bar was placed on the release paper. The composition was applied at 60° C. in front of the bar and a film was drawn approximately 10 inches in length. The film on the paper lined glass backing plate was passed under a curing lamp (1.2 J/cm$^2$ exposure to a Mercury D-bulb). The paper (and film on the paper) were removed from the glass backing plate and placed in a nitrogen purge box that has a UV-transparent lid. The contents were purged with nitrogen for 5 minutes and then cured for a second time under the curing lamp. That ensured full curing of the coating composition. The cured film on the release paper was removed from the nitrogen purge box and left undisturbed overnight. The film was peeled from the release paper and tested. The cured coatings from the compositions were then tested for tensile strength, Young's modulus, and elongation at break. The results of the testing are produced in the table above.

The results of the testing, set forth in the table above, reveal that increasing the weight percentage of the isophorone-based ureidopyrimidinone PPG acrylate product of reaction (XVI) in the coating composition formulation tested increases the tensile strength, increases the Young's modulus, and decreases the percentage elongation at break of the cured coating composition. The results demonstrate that quadruple hydrogen bonding between polymer chains provided by the ureidopyrimidinone functional group provides similar results as a typical diacrylate covalent bonding cross-linker.

Further tests were conducted again using the isophorone-based ureidopyrimidinone PPG acrylate product of reaction (XVI) in the coating composition formulation tested but without any covalent cross-linker (e.g., diacrylate). The results of the testing are produced in the table below.

| Comp. | Elast. (% by wt.) | UPy (% by wt.) | Mon - 1 (% by wt.) | Mon - 2 (% by wt.) | Tensile Str. (MPa) | Percent Elong. | Young's Mod. (MPa) |
|---|---|---|---|---|---|---|---|
| 6 | 15 | 8 | 69 | 5 | 0.43 | 140 | 0.54 |
| 7 | 15 | 10 | 67 | 5 | 0.66 | 170 | 0.71 |
| 8 | 15 | 12 | 65 | 5 | 0.65 | 180 | 0.67 |

Again, each composition further included 3 weight percent of a photoinitiator. The elastomer, the first monomer, and the second monomer were the same as utilized in the preceding set of testing. Compositions 7 and 8, after curing, in particular had tensile strengths and Young's modulus values higher than composition 5, although compositions 7 and 8 lacked any covalent cross-linker and utilized only the hydrogen bonding between polymer chains that the ureidopyrimidinone functional group provided.

Cured coating compositions including the isophorone-based ureidopyrimidinone PPG acrylate product of reaction (XVI) are self-healing. A film of one of the cured coating compositions was cut. The cut film was held at 90° C. for two days and then for five days at room temperature, the higher temperature simulating accelerating aging. After that time period, the cut placed in the film had visually almost vanished. The tensile strength of this cut and self-healed film was tested and compared with the tensile strength of a virgin (uncut) portion of the film. The tensile strengths were the same, within experimental error. Thus, in the optical fiber coating compositions of the present disclosure, one or both of the first molecule (that covalently bonds to a first polymer chain during polymerization) and the second molecule (that covalently bonds to a second polymer chain during the polymerization), with the ureidopyrimidinone functional The contents of the flasks were cooled to room temperature. Then, 4.98 grams of ethoxylated(4)nonylphenol acrylate (Sartomer SR504) was added. The solvent was removed from the contents under reduced pressure. The resulting solution was 4:1 (by weight) isophorone-based caprolactone ureidopyrimidinone acrylate to ethoxylated(4)nonylphenol acrylate.

Various coating compositions incorporating the isophorone-based caprolactone ureidopyrimidinone acrylate product of reaction equation (XVII) were prepared, cured, and tested. The results of the testing are set forth in the table below.

| Comp. | Elast. (% by wt.) | UPy (% by wt.) | Mon - 1 (% by wt.) | Mon - 2 (% by wt.) | Mon -3 (% by wt.) | Tensile Str. (MPa) | Percent Elong. | Young's Mod. (MPa) |
|---|---|---|---|---|---|---|---|---|
| 9 | 15 | 10 | 62 | 0 | 10 | 1.02 | 130 | 0.85 |
| 10 | 15 | 10 | 42 | 20 | 10 | 1.15 | 130 | 1.01 | groups of the first molecule and the second molecule hydrogen bonding to each other during the polymerization, can have the general formula of the product of reaction equation (XVI).

Example 4—Isophorone-Based Caprolactone Ureidopyrimidinone Acrylate

As an alternative to reacting the isophorone-based ureidopyrimidinone isocyanate with a PPG acrylate, as in general reaction (XVI) above, the isophorone-based ureidopyrimidinone isocyanate can be reacted with a caprolactone acrylate, for example the monomer-2 (SR495 available from Sartomer-Exton, Pa.) utilized in the above coating compositions. The reaction of the isophorone-based ureidopyrimidinone isocyanate with the caprolactone acrylate is represented below by general reaction equation (XVII):

Again, each composition further included 3 weight percent of a photoinitiator. The elastomer ("Elast.") utilized was EVA, as in Example 3. The first monomer ("Mon-1") utilized was the alkoxylated lauryl acrylate monomer CD9075 produced by Sartomer. The second monomer ("Mon-2") utilized was a lauryl acrylate monomer (more specifically, SR335 available from Sartomer). "Mon-3" refers to a third monomer, and the third monomer in this instance was the caprolactone acrylate monomer SR495 produced by Sartomer. The elastomer helped impart improved tensile strength to the cured coatings made from the above coating formulations.

Another set of coating formulations incorporating the isophorone-based caprolactone ureidopyrimidinone acrylate product of reaction equation (XVII) were tested. The results

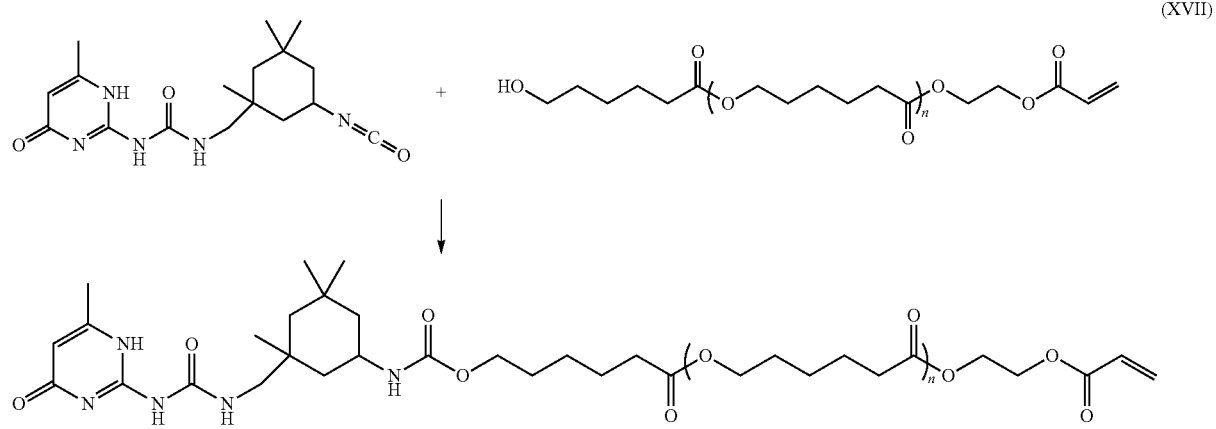

(XVII)

wherein, n is an integer. In some embodiments, n is an integer between and including 1 and 3. More specifically, 10.0 grams of the isophorone-based ureidopyrimidinone isocyanate was dissolved in 200 mL of chloroform (Aldrich 650498) in a 500 mL round-bottom flask. Then, 9.91 g of the caprolactone acrylate (Sartomer SR495) and 20 μL of dibutyltindilaurate (Aldrich 291234) were added to the flask. The contents were stirred in a 60° C. oil bath for 48 hours.

are set forth in the table below. These coating formulations do not include an elastomer, as the previous set of coating formulations did. However, these coating formulations did include non-reactive urethane oligomers and/or non-reacting branched urethane oligomers, as detailed further below. The coating formulations, when cured, exhibited beneficial tensile strength, elongation at break, and Young's modulus values.

| Comp. | UPy (% by wt.) | Mon - 1 (% by wt.) | Mon - 2 (% by wt.) | Mon - 3 (% by wt.) | NRU (% by wt.) | Tensile Str. (MPa) | Percent Elong. | Young's Mod. (MPa) |
|---|---|---|---|---|---|---|---|---|
| 11 | 10 | 33 | 16 | 10 | 30 | 0.49 | 37 | 1.8 |
| 12 | 10 | 23 | 16 | 10 | 40 | 0.49 | 39 | 1.82 |
| 13 | 6 | 37 | 16 | 10 | 30 | 0.47 | 63 | 1.1 |
| 14 | 4 | 39 | 16 | 10 | 30 | 0.42 | 86 | 0.76 |
| 15 | 6 | 37 | 16 | 10 | 30 | 0.35 | 55 | 0.96 |
| 16 | 4 | 39 | 16 | 10 | 30 | 0.31 | 67 | 0.72 |
| 17 | 10 | 45 | 4 | 10 | 30 (B) | 0.29 | 37 | 1.15 |
| 18 | 10 | 39 | 0 | 10 | 40 (B) | 0.27 | 49 | 0.91 |
| 19 | 6 | 49 | 4 | 10 | 30 (B) | 0.19 | 51 | 0.63 |
| 20 | 6 | 67 | 16 | 10 | 0 | 0.12 | 5 | 0.75 |
| 21 | 8 | 65 | 16 | 10 | 0 | 0.29 | 6 | 1.01 |
| 22 | 10 | 63 | 16 | 10 | 0 | 0.41 | 6 | 1.49 |

The first monomer ("Mon-1") in this instance was a nonyl phenol (EO)8 acrylate monomer (more specifically, Miramer M166, available from Miwon Specialty Chemical Company, South Korea). The second monomer ("Mon-2") in this instance was an ethoxylated nonyl-phenol acrylate (more specifically, SR504 available from Sartomer). The third monomer ("Mon-3") in this instance was a caprolactone acrylate monomer (more specifically, SR495 available from Sartomer). The weight percentages of the non-reactive urethanes, with the "(B)" signifying branched non-reactive urethanes, are identified under the heading "NRU." The tensile strength, percent elongation at break, and Young's modulus values of the cured coating compositions 11-22 above are comparable to values of cured coating compositions utilizing diacrylate covalent cross-linkers. Thus, in the optical fiber coating compositions of the present disclosure, one or both of the first molecule (that covalently bonds to a first polymer chain during polymerization) and the second molecule (that covalently bonds to a second polymer chain during the polymerization), with the ureidopyrimidinone functional groups of the first molecule and the second molecule hydrogen bonding to each other during the polymerization, can have the general formula of the product of reaction equation (XVII).

Aspect 1 of the description is:
An optical fiber coating composition comprising:
  one or more monomers, the one or more monomers forming a first polymer chain and a second polymer chain upon polymerization; and
  one or more hydrogen bonding cross-linkers including a first molecule that covalently bonds to the first polymer chain during the polymerization and a second molecule that covalently bonds to the second polymer chain during the polymerization;
  wherein, the first molecule includes a first functional group and the second molecule includes a second functional group, the first functional group and the second functional group hydrogen bonding to form three or more hydrogen bonds during the polymerization Aspect 2 of the description is:
The optical fiber coating composition of Aspect 1,
wherein, the first functional group and the second functional group are each a ureidopyrimidinone functional group, and the first molecule and the second molecule each have the general formula:

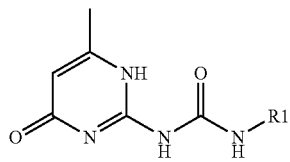

wherein, R1 is not hydrogen, and R1 of the first molecule and R1 of the second molecule are the same or different.

Aspect 3 of the description is:
The optical fiber coating composition of Aspect 2,
wherein, R1 comprises an acrylate group or a methacrylate group.

Aspect 4 of the description is:
The optical fiber coating composition of any of Aspects 1-3, wherein, the first molecule and the second molecule have the general formula:

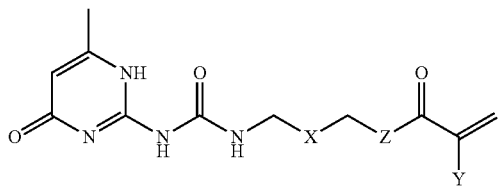

wherein, X is not hydrogen, and Y is hydrogen or a methyl group, and Z is oxygen or $CH_2$; and
wherein, X, Y, and Z for the first molecule and X, Y, and Z for the second molecule are the same or different.

Aspect 5 of the description is:
The optical fiber coating composition of any of Aspects 1-4, wherein, the first functional group and the second functional group are different.

Aspect 6 of the description is:
The optical fiber coating composition of any of Aspects 1-5, wherein, one or both of the first molecule and the second molecule have the general formula:

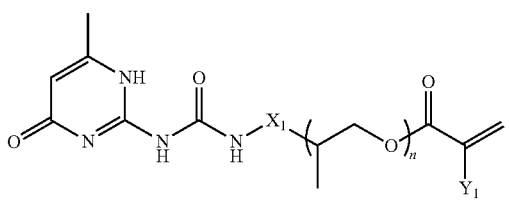

wherein, $X_1$ is not hydrogen, $Y_1$ is hydrogen or a methyl group, and n is an integer Aspect 7 of the description is:

The optical fiber coating composition of any of Aspects 1-5, wherein, one or both of the first molecule and the second molecule have the general formula:

[chemical structure]

wherein, n is an integer

Aspect 8 of the description is:

The optical fiber coating composition of any of Aspects 1-5, wherein, one or both of the first molecule and the second molecule have the general formula:

[chemical structure]

wherein, n is an integer.

Aspect 9 of the description is:

The optical fiber coating composition of any of Aspects 1-5, wherein, one or both of the first molecule and the second molecule have the general formula:

[chemical structure]

wherein, n is an integer.

Aspect 10 of the description is:

The optical fiber coating composition of any of Aspects 1-9 further comprising a co-polymer of ethylene and vinyl acetate.

Aspect 11 of the description is:

The optical fiber coating composition of any of Aspects 1-10, wherein, the optical fiber coating composition comprises 39 to 89 percent by weight of the one or more monomers and 4 to 15 percent by weight of the one or more hydrogen bonding cross-linkers.

Aspect 12 of the description is:

The optical fiber coating composition of any of Aspects 1-11, wherein, the one or more monomers are mono-acrylate monomers; and wherein, the optical fiber coating composition does not include any multi-acrylate monomers.

Aspect 13 of the description is:

An optical fiber coating composition comprising:

one or more monomers, the one or more monomers forming a first polymer chain and a second polymer chain upon polymerization;

a first molecule, the first molecule including a first ureidopyrimidinone functional group and covalently bonding to the first polymer chain during the polymerization;

a second molecule, the second molecule including a second ureidopyrimidinone functional group and covalently bonding to the second polymer chain during the polymerization; and a third molecule, the third molecule including a third ureidopyrimidinone functional group and a fourth ureidopyrimidinone functional group, the third ureidopyrimidinone functional group hydrogen bonding with the first ureidopyrimidinone functional group during the polymerization and the fourth ureidopyrimidinone functional group hydrogen bonding with the second ureidopyrimidinone functional group during the polymerization.

Aspect 14 of the description is:

The optical fiber coating composition of Aspect 13, wherein, the first molecule and the second molecule each have the general formula:

[chemical structure]

wherein, R1 is not hydrogen, and R1 for the first molecule and R1 for the second molecule are the same or different.

Aspect 15 of the description is:
The optical fiber coating composition of Aspect 13, wherein, the third molecule has the general formula:

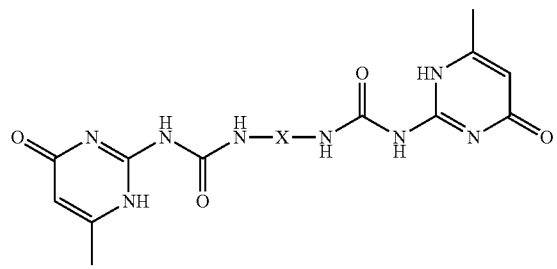

wherein, X is not hydrogen.

Aspect 16 of the description is:
The optical fiber coating composition of Aspect 13, wherein, the third molecule has the general formula:

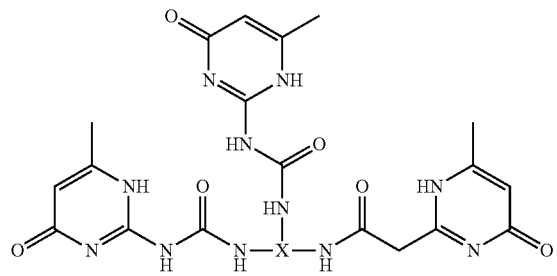

wherein, X is not hydrogen.

Aspect 17 of the description is:
The optical fiber coating composition of Aspect 13, wherein, the first molecule is a ureidopyrimidinone acrylate; wherein, the second molecule is a ureidopyrimidinone acrylate; and
wherein, the third molecule has the general formula:

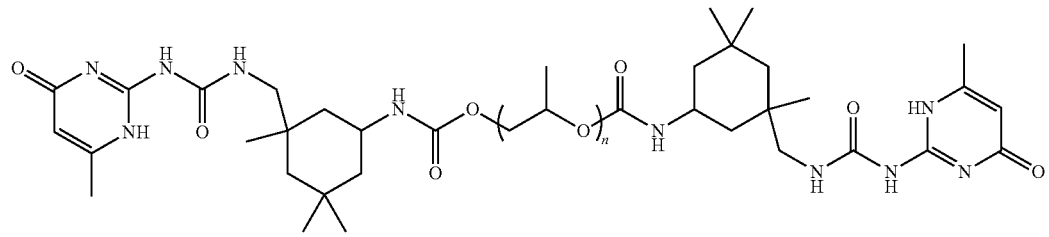

wherein, n is an integer.

Aspect 18 of the description is:
The optical fiber coating composition of any of Aspects 1-17, wherein the one or more monomers includes a radiation-curable monomer.

Aspect 19 of the description is:
The optical fiber coating composition of Aspect 18, wherein the radiation-curable monomer is a (meth)acrylate monomer.

Aspect 20 of the description is:
The optical fiber coating composition of any of Aspects 1-19, further comprising a photoinitiator.

Aspect 21 of the description is:
The optical fiber coating composition of Aspect 1, wherein the first functional group comprises two hydrogen donor groups and the second functional group comprises a hydrogen acceptor group.

Aspect 22 of the description is:
The optical fiber coating composition of Aspect 21, wherein the second functional group comprises two hydrogen acceptor groups.

Aspect 23 of the description is:
The optical fiber coating composition of Aspect 21, wherein the first functional group comprises a hydrogen acceptor group and the second functional group comprises a hydrogen donor group.

Aspect 24 of the description is:
The optical fiber coating composition of Aspect 23, wherein the first functional group comprises two hydrogen acceptor groups and the second functional group comprises two hydrogen donor groups.

Aspect 25 of the description is:
The optical fiber coating composition of Aspect 24, wherein the first functional group comprises an equal number of hydrogen acceptor groups and hydrogen donor groups, and wherein the second functional group comprises an equal number of hydrogen acceptor groups and hydrogen donor groups.

Aspect 26 of the description is:
The optical fiber coating composition of Aspect 1, wherein the first functional group and the second functional group are terminal functional groups.

Aspect 27 of the description is:
The optical fiber coating composition of Aspect 1, wherein the first functional group and the second functional group hydrogen bonding to form four or more hydrogen bonds during the polymerization.

Aspect 28 of the description is:
The optical fiber coating composition of Aspect 1, wherein the first molecule comprises a (meth)acrylate group.

Aspect 29 of the description is:
The optical fiber coating composition of Aspect 1, wherein the second molecule comprises a (meth)acrylate group.

Aspect 30 of the description is:
An optical fiber coating composition comprising:
a radiation-curable monomer; and
a hydrogen bonding cross-linker comprising a ureidopyrimidinone functional group Aspect 31 of the description is:
The optical fiber coating composition of Aspect 30, further comprising a photoinitiator.

Aspect 32 of the description is:
The optical fiber coating composition of Aspect 30 or 31, wherein the hydrogen bonding cross-linker comprises two ureidopyrimidinone functional groups.

Aspect 33 of the description is:
The cured product of the optical fiber coating composition of any of Aspects 1-32.

Aspect 34 of the description is:
An optical fiber comprising a coating, the coating comprising a first polymer chain comprising a first ureidopyrimidinone functional group and a second polymer chain comprising a second ureidopyrimidinone functional group.

Aspect 35 of the description is:

The optical fiber of Aspect 34, wherein the first ureidopyrimidinone functional group is hydrogen bonded to the second ureidopyrimidinone functional group Aspect 36 of the description is:

A method of manufacturing an optical fiber comprising:

applying a coating composition to an optical fiber, the coating composition comprising:

one or more monomers, the one or more monomers forming a first polymer chain and a second polymer chain upon polymerization; and one or more hydrogen bonding cross-linkers including:

a first molecule, the first molecule including a ureidopyrimidinone functional group and covalently bonding to the first polymer chain during the polymerization;

a second molecule, the second molecule including a ureidopyrimidinone functional group and covalently bonding to the second polymer chain during the polymerization;

wherein, the ureidopyrimidinone functional group of the first molecule and the ureidopyrimidinone functional group of the second molecule hydrogen bond to form a quadruple hydrogen bond; and wherein, the first molecule and the second molecule each have the general formula:

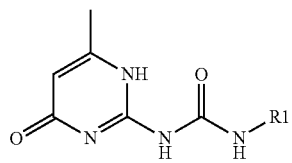

wherein, R1 is not hydrogen, and R1 for the first molecule and R1 for the second molecule are the same or different.

Aspect 37 of the description is:

The method of Aspect 36, wherein, R1 for one or both of the first molecule and the second molecule comprises an acrylate group.

Aspect 38 of the description is:

The method of Aspect 36 or 37, wherein the coating composition comprises 20 to 95 percent by weight of the one or more monomers and 2 to 30 percent by weight of the one or more hydrogen bonding cross-linkers.

It will be apparent to those skilled in the art that various modifications and variations can be made without departing from the spirit or scope of the claims.

What is claimed is:

1. An optical fiber coating composition comprising:

one or more monomers, the one or more monomers forming a first polymer chain and a second polymer chain upon polymerization; and one or more hydrogen bonding cross-linkers including a first molecule that covalently bonds to the first polymer chain during the polymerization and a second molecule that covalently bonds to the second polymer chain during the polymerization;

wherein, the first molecule includes a first functional group and the second molecule includes a second functional group, the first functional group and the second functional group hydrogen bonding to form three or more hydrogen bonds during the polymerization, and wherein, the first functional group and the second functional group are each a ureidopyrimidinone functional group, and the first molecule and the second molecule each have the general formula:

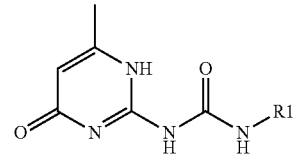

wherein, R1 is not hydrogen, and R1 of the first molecule and R1 of the second molecule are the same or different, and wherein, one or both of the first molecule and the second molecule have the general formula:

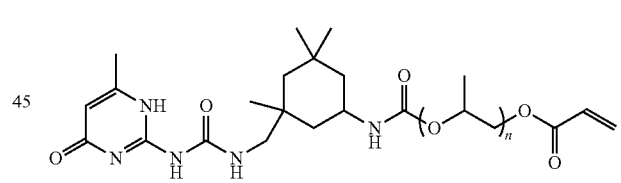

wherein, n is an integer.

2. The optical fiber coating composition of claim 1, wherein, R1 comprises an acrylate group or a methacrylate group.

3. The optical fiber coating composition of claim 1, wherein, the first molecule has the general formula:

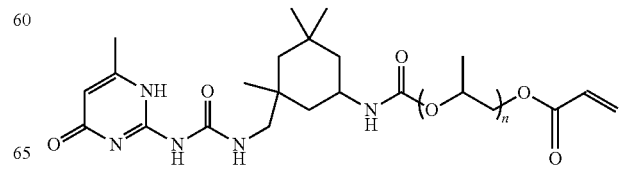

wherein, n is an integer, and the second molecule has the general formula:

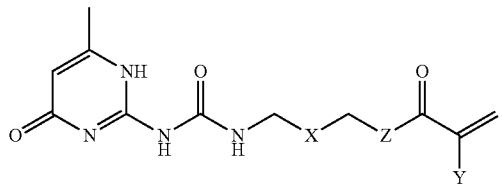

wherein, X is not hydrogen, and Y is hydrogen or a methyl group, and Z is oxygen or CH$_2$.

4. The optical fiber coating composition of claim 1, wherein, the first functional group and the second functional group are different.

5. The optical fiber coating composition of claim 1, wherein, the first molecule has the general formula:

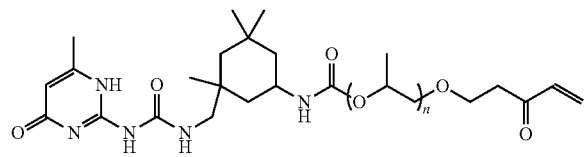

wherein, n is an integer, and the second molecule has the general formula:

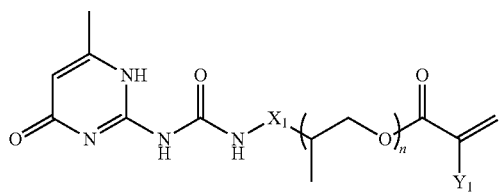

wherein, X$_1$ is not hydrogen, Y$_1$ is hydrogen or a methyl group, and n is an integer.

6. The optical fiber coating composition of claim 1, wherein, the first molecule has the general formula:

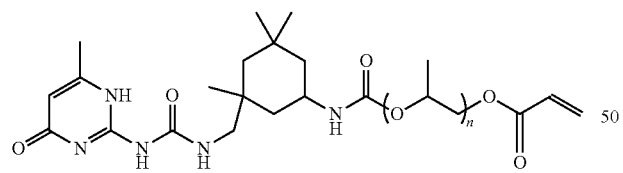

wherein, n is an integer, and the second molecule has the general formula:

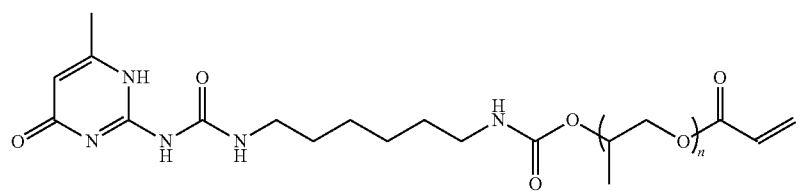

wherein, n is an integer.

7. The optical fiber coating composition of claim 1, wherein the one or more monomers includes a radiation-curable monomer.

8. The optical fiber coating composition of claim 7, wherein the radiation-curable monomer is a (meth)acrylate monomer.

9. The optical fiber coating composition of claim 1, wherein the first functional group comprises two hydrogen donor groups and the second functional group comprises a hydrogen acceptor group.

10. The optical fiber coating composition of claim 9, wherein the first functional group comprises a hydrogen acceptor group and the second functional group comprises a hydrogen donor group.

11. The optical fiber coating composition of claim 1, wherein the first functional group and the second functional group hydrogen bond to form four or more hydrogen bonds during the polymerization.

12. The optical fiber coating composition of claim 1, wherein the first molecule comprises a (meth)acrylate group.

13. The cured product of the optical fiber coating composition of claim 1.

14. An optical fiber coating composition comprising:
one or more monomers, the one or more monomers forming a first polymer chain and a second polymer chain upon polymerization; and
one or more hydrogen bonding cross-linkers including a first molecule that covalently bonds to the first polymer chain during the polymerization and a second molecule that covalently bonds to the second polymer chain during the polymerization;
wherein, the first molecule includes a first functional group and the second molecule includes a second functional group, the first functional group and the second functional group hydrogen bonding to form three or more hydrogen bonds during the polymerization, and
wherein, the first functional group and the second functional group are each a ureidopyrimidinone functional group, and the first molecule and the second molecule each have the general formula:

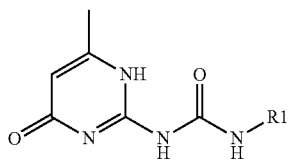

wherein, R1 is not hydrogen, and R1 of the first molecule and R1 of the second molecule are the same or different, and
wherein, one or both of the first molecule and the second molecule have the general formula:

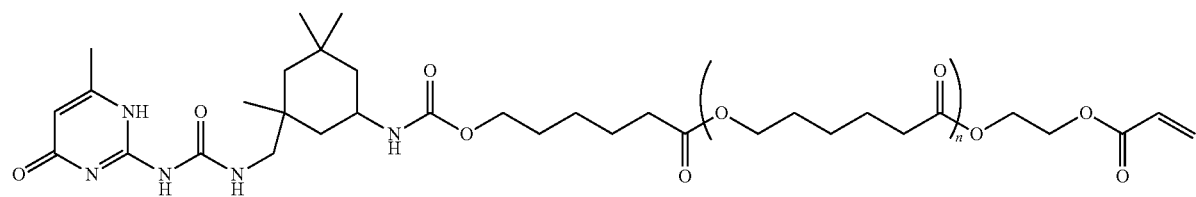
wherein, n is an integer.
* * * * *